US011036198B2

(12) United States Patent
Davies et al.

(10) Patent No.: US 11,036,198 B2
(45) Date of Patent: Jun. 15, 2021

(54) MONITORING OF DISTRIBUTED SYSTEMS WITH MEASURING EFFECTIVENESS OF A FIRST POLICY TO DERIVE A SATISFACTION MEASURE

(71) Applicant: British Telecommunications Public Limited Company, London (GB)

(72) Inventors: Nicholas John Davies, London (GB); Paul Francis McKee, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/526,257

(22) Filed: Jul. 30, 2019

(65) Prior Publication Data

US 2020/0073354 A1 Mar. 5, 2020

(30) Foreign Application Priority Data

Aug. 30, 2018 (EP) .................................... 18191853

(51) Int. Cl.
 G05B 19/042 (2006.01)
(52) U.S. Cl.
 CPC ............... G05B 19/0428 (2013.01); *G05B 2219/24015* (2013.01); *G05B 2219/2614* (2013.01)
(58) Field of Classification Search
 CPC ................................................ G05B 19/0428
 USPC ....................................................... 700/276
 See application file for complete search history.

(56) References Cited

U.S. PATENT DOCUMENTS

| 5,786,993 | A | 7/1998 | Frutiger et al. |
| 8,504,874 | B2 | 8/2013 | Goldszmidt et al. |
| 9,274,512 | B1 | 3/2016 | Zima |
| 2004/0193912 | A1 | 9/2004 | Li et al. |
| 2005/0149599 | A1 | 7/2005 | Rana et al. |
| 2005/0193196 | A1* | 9/2005 | Huang ................ G06F 21/6218 713/166 |
| 2008/0091682 | A1* | 4/2008 | Lim ...................... G06F 21/604 |
| 2009/0178107 | A1* | 7/2009 | Karjoth ............. G06F 16/24564 726/1 |

(Continued)

FOREIGN PATENT DOCUMENTS

| EP | 2469479 A1 | 6/2012 |
| GB | 2479817 A | 10/2011 |

(Continued)

OTHER PUBLICATIONS

Chatterjee et al, Differentiated Services in Wireless Data Networks, 2002, WoWMoM, pp. 8 (Year: 2002).*

(Continued)

*Primary Examiner* — Suresh Suryawanshi
(74) *Attorney, Agent, or Firm* — Patterson Thuente Pedersen, P.A.

(57) ABSTRACT

In a managed system controlled by multiple policy managers, conflicts between the policies of the managers are resolved by generating a satisfaction measure to be transmitted to policy managers together with sensor data, indicative of how closely the sensor data satisfies the policy which caused it. This satisfaction measure is used to determine whether actuators controlled by the other policy managers should be triggered by the sensor data. This allows policies to co-operate to prevent conflict between the conflicting requirements of different policies.

15 Claims, 5 Drawing Sheets

(56) References Cited

U.S. PATENT DOCUMENTS

| | | | |
|---|---|---|---|
| 2011/0145884 A1* | 6/2011 | Rivers | G06F 21/6218 726/1 |
| 2012/0072769 A1* | 3/2012 | Goldszmidt | G06F 11/3055 714/15 |
| 2012/0323615 A1 | 12/2012 | Johnson et al. | |
| 2013/0031157 A1* | 1/2013 | McKee | G06F 9/542 709/201 |
| 2013/0226320 A1 | 8/2013 | Berg-Sonne et al. | |
| 2013/0310986 A1 | 11/2013 | Gust et al. | |
| 2015/0337806 A1 | 11/2015 | Damgaard et al. | |
| 2016/0156607 A1 | 6/2016 | Kim et al. | |
| 2017/0006141 A1 | 1/2017 | Bhadra | |
| 2017/0026858 A1* | 1/2017 | McKee | H04L 67/322 |
| 2017/0093915 A1 | 3/2017 | Ellis et al. | |
| 2017/0195294 A1 | 7/2017 | Branca | |
| 2018/0092151 A1 | 3/2018 | Liu et al. | |
| 2020/0065123 A1 | 2/2020 | Yang et al. | |
| 2020/0125048 A1* | 4/2020 | McKee | G06Q 10/20 |

FOREIGN PATENT DOCUMENTS

| | | |
|---|---|---|
| GB | 2558902 A | 7/2018 |
| KR | 20140015745 A | 2/2014 |
| WO | WO-2015042899 A1 | 4/2015 |
| WO | WO2015/092395 A1 | 6/2015 |
| WO | WO-2016119816 A1 | 8/2016 |
| WO | WO2018/133992 A1 | 7/2018 |

OTHER PUBLICATIONS

Extended European Search Report for Application No. 17152054.7, dated Jun. 27, 2017, 7 pages.

Fuigini, M., et al., "Dynamic Security Modeling in Risk Management Using Environmental Knowledge," 2014 IEEE 23rd International WETICE Conference, May 2014, Retrieved from https://www.researchgate.net/publication/267330780 on Oct. 28, 2016, 7 pages.

Great Britain Search Report under Sections 17 Application No. GB1700868.1, dated Jun. 9, 2017, 1 page.

International Preliminary Report on Patentability for Application No. PCT/EP2017/082099, dated May 23, 2019, 18 pages.

International Search Report and Written Opinion for Application No. PCT/EP2017/082099, dated Feb. 26, 2018, 11 pages.

Application and File History for U.S. Appl. No. 16/477,782, filed Jul. 12, 2019, Inventor: McKee.

Extended European Search Report for Application No. 18191853.3, dated Dec. 17, 2018 (7 pgs).

Great Britain Search Report under Section 17 for Application No. 1814131.7, dated Jan. 11, 2019 (2 pgs).

Li et al., "Policy-based Secure and Trustworthy Sensing for Internet of Things in Smart Cities," IEEE Internet of Things Journal, vol. 5, No. 2, Apr. 2018, pp. 716-723, (16 pgs).

\* cited by examiner

MONITORING OF DISTRIBUTED SYSTEMS WITH MEASURING EFFECTIVENESS OF A FIRST POLICY TO DERIVE A SATISFACTION MEASURE

CROSS-REFERENCE TO RELATED APPLICATION

The present application claims priority to EP Application No. 18191853.3 filed Aug. 30, 2018, which is hereby incorporated herein in its entirety by reference.

TECHNICAL FIELD

This disclosure relates to monitoring of distributed systems and in particular to the management of sensors and actuators operating in the "Internet of Things". Good quality, reliable data is fundamental to the Internet of Things.

BACKGROUND

The basic principle of the Internet of Things (IoT) is that a large number of simple sensors and other devices are connected to networks to enable remote data sensing and automated control, enabling objects to sense their environment, communicate with each other to produce new information, and act on that information ultimately through some form of embedded intelligent processing. This helps optimize both use of resources and user satisfaction with the services provided.

Creating a fully instrumented and connected world is an expensive and technically challenging task and thus IoT adoption is initially finding application in fields where the costs and benefits make the adoption most economically worthwhile, such as transport, "Smart Cities", retail, logistics, home automation and "smart factories". However, over time it is expected that increasing numbers of systems and sensors will be integrated as data is shared to drive further efficiencies.

For example, in retail applications, the aim is to integrate all available shopping channels—in-store, online store, mobile apps, mail-order—to offer a seamless shopping experience for customers. In particular digital signage systems are being developed, such as display screens connected to a network that is constantly mining, analyzing, and responding to a broad spectrum of real and near-real time data to dynamically tune and change the screens' content.

In the field of mobility, applications are being developed for connected vehicles, asset/fleet management and freight monitoring.

There is also a growing market of "smart cities" in which data from numerous independent sources are merged, and used to improve the functioning of city services. This general approach is also applicable to any collaborative environment where multiple infrastructure owners collaborate to achieve a concerted goal. Although the embodiments to be described later in this specification are directed to "smart cities" environments, this is not intended to be limiting as the principles are of wider application.

Policy-based management has proved to be an effective approach in the management of large-scale distributed systems. In this approach, devices issue messages that indicate their state and any deviations from expected behavior, and these messages are transmitted to policy decision points (PDP) where the messages are used to activate policies. These systems use the event—condition—action model of policies, in which the device message is the event that triggers the policy, the condition section allows for the evaluation of tests that establish the system context in a greater level of detail, and finally the results of the conditional tests establish an appropriate action that is sent to a policy execution point (PEP) associated with any device that needs to be changed as a result of the policy action. The ability to add, remove and modify policies gives these systems great flexibility and extensibility, as new managed devices can be added to the management domain at any time. Policy-based management is commonly adopted for the management system of large complex dynamic systems. However, there is an important distinction between systems generally in use today and the proposed use of such systems in the context of "smart cities".

Policy-based management systems in use today typically have a single management domain where all of the managed entities are owned and controlled by the policy authors. This means that the placement and performance of sensors and actuators in the managed system is well-known and well-characterized and that the management system has a well-defined set of common goals. This means that, in practice, the results of conditional statements in the policy definitions are assumed to be both reliable and truthful, and can be used to unequivocally establish a local management context for successful choice of an appropriate action or set of actions. The conditional statements may be considered as part of a risk-management strategy: a single observed event may potentially cause a number of changes to the managed system, some of which might be significant in impact. The collection of further, confirmatory, data allows the choice of action to be narrowed and the risk of incorrect actions reduced. Systems of this type also assume that the policy authors have a high level of domain-specific knowledge that allows the creation of effective and accurate policies.

In the early stages of IoT deployment, each small system will have been installed to meet the specific goals of its particular owner or users. As systems expand, individual systems may start to interact. In the evolving "smart cities" systems, sensor infrastructure may be built in an ad hoc way over a period of time and by different organizations, with different requirements and different end goals. Authors of policies are likely to find that, in order to establish the required management context for any policy-based actions, they require data inputs from sensors that they neither own nor control. Typically a management hierarchy will be provided that bridges the management function across many smaller initial deployments in a federated system. In many cases, the goals of the higher level management system will be different from the lower level system goals, and may in fact be in conflict where there is tension between local and more global optimization.

In the early evolution of a large smart system it is also possible that neighboring management domains might share sensor data in order to achieve greater knowledge of local conditions, and in such cases there would no issue of conflict between rules in each neighbor domain but they may still end up in a less than optimal state striving for goals that are different.

In current systems much of the system management is based on forms of policies or rules which assume that they will be satisfactorily executed on demand; and no feedback mechanism exists, other than generation of an error message. When used in federated systems it is generally assumed that higher levels of the management hierarchy can observe the outputs of system sensors and use them as a basis for management policies at that level. The sensor outputs may be used in near-real time, or observed as time varying traces. The problem this causes is that the higher level manager can get a real-time indication of the system state but no indication of whether any local management system requires the system to be in that state. This then leads to two undesirable outcomes: either the higher level manager overrules the local manager and reduces local efficiency; or contention arises between the two management levels with different goals, with each adjusting the system to meet their goals in turn in a potentially infinite loop. There is a danger that such constant changes in system settings could produce instability that propagates into other management systems and stops any attempt at achieving a global optimum.

In current smart systems created by federation of smaller domains the higher level manager just has access to the various data feeds from existing sensors and actuators. It can obtain the current reading or historical trace of readings for any resource it has management access to but lacks the information needed to use these readings effectively. The data readings can supply the state of the system but very little indication of why the system is in that state. This is particularly important when some of the lower level systems are in states that do not agree with the higher level manager's goals In the standard ("event-condition-action") model of policy management, events are used to select policies from a local policy store, and each policy has one or more conditions associated with it that check the system state and provide a context to determine which action to take in response to the initial stimulating event. A check action is added to the end of the policy that provides an indication of the success of the policies action, this may be a sensor associated with the triggering action or an independent sensor. Using the result of the check measurement and the policies initial target a satisfaction measure is calculated that indicates how well the policies action has addressed the target requirement.

The applicant's earlier patent applications filed on Feb. 2, 2018 as GB1801749.1 and EP18154987.4 disclosed the use of a check sensor input to produce a satisfaction measure for local management of policies. Each management policy was extended from the event condition action model (ECA) to include a check action that determined if the action of the policy had achieved the local management objective. The satisfaction measure is a means of managing the effectiveness of locally defined policies and improving local system outcomes. A positive index indicates that the policy achieves its goal; a neutral index indicates little effect on the desired goal, and a negative index a divergence from the desired goal. In the earlier application, the indices built up as the system executes are used to manage the policy store and identify poorly performing policies for alteration or removal.

In our earlier application this satisfaction measure is used to manage the policy set and optimize the quality of the local management.

The assessment and use of this satisfaction measure was purely local and based on the local management objectives. This provides policy authors with an indication of the reliability of the sensors, and the data they produce, in order to make appropriate decisions and manage the risk to their own system. The present disclosure extends the principle of the satisfaction indices for use in a federated or hierarchical management structure.

SUMMARY

According to a first aspect of the disclosure there is provided a method of monitoring and controlling an automated system using a network of sensors and actuators operating in accordance with predetermined policies, wherein effectiveness of individual policies is monitored by comparing inputs from the sensors with intended outcomes from implementations of policies controlled by previous inputs from one or more of the same sensors, wherein effectiveness of a first policy implemented by a first decision point is measured by identifying an intended outcome from the policy, measuring an input from a sensor following implementation of the policy, comparing the input from the sensor with an intended outcome of the policy to derive a satisfaction measure, and wherein the satisfaction measure is used as a metadata element in data transmitted to one or more further decision points to control implementation of further policies associated with the further decision points.

According to a second aspect, the disclosure provides a network for monitoring and controlling an environment in accordance with predetermined policies, the network having a plurality of sensors and actuators and a plurality of policy decision points for responding to trigger inputs received from the sensors, one or more data stores for maintaining policies for retrieval by the policy decision points, and a plurality of policy execution points for controlling actuators in response to commands received from the policy decision points, further comprising a policy satisfaction monitoring element which identifies effectiveness of a first policy implemented by a first decision point by identifying an intended outcome from the first policy, measuring an input from a sensor following implementation of the first policy, comparing the input from the sensor with an intended outcome of the first policy to derive a satisfaction measure, and transmitting the satisfaction measure as a metadata element in data transmitted to one or more further decision points associated with further policies.

In embodiments of the disclosure, the further policies suspend actuation commands to an actuator controlled by both the first policy and the further policies if the metadata element indicates the first policy has been satisfied. One or more further policies have provision to over-ride the first policy in response to inputs from further sensors.

The first policy may include a check function, the check function using a sensor input to monitor if actions generated by the first policy are successful in moving the system towards a system state specified by the first policy, and generating a positive satisfaction measure if the check function is satisfied. In order that the system can stabilize, the check function may be initiated after a predetermined period has elapsed after the actions initiated by the first policy.

The metadata carrying the satisfaction measure may also include data identifying a policy creator, and resources which were changed or measured when the first policy was enacted.

The disclosure also extends to a computer system including a processor and memory storing computer program code for performing a method of the disclosure, and to a computer program element comprising computer program code to, when loaded into a computer system and executed thereon, cause the computer system to perform a method of the disclosure.

Embodiments of this disclosure use a satisfaction measure generated by each IoT system as a dynamic metadata element associated with the sensor datastreams and the readings obtained from actuators, together with information such as the time and date it was created, and the identity of the policy that was responsible for the index creation. This index can be used to identify the policy creator responsible for creating the action and which resources were changed or measured when the policy was enacted. The satisfaction measure provides an input to a higher level manager to view not only readings or settings from individual sensors and actuators but also an assessment of the desirability of the observed values at the local level. This supplies valuable local context to the readings observed and can facilitate improved higher level management decision processes. In particular unwanted fluctuations can be distinguished from desired changes, to allow any alteration of local parameters to be a deliberate decision on the part of the higher level manager.

Embodiments of the disclosure make local satisfaction indices visible to other IoT management functions that may be operating to different goals, to provide input to a neighboring management domain, or a management domain operating at a higher level. Each sensor or actuator in the local system has dynamic metadata associated with its data stream. A positive satisfaction measure can be taken as an indication that the policy has achieved the desired local goal and moved the system state to a desired value, and is therefore a good indicator of local management/user satisfaction with that state.

In a shared management situation such an indication of local policy satisfaction can be a useful input in deciding if a second manager should be able to change the state of a resource through policy control, but a precedence relationship is required between the potential management systems to establish the right to change.

A control override may also be provided to allow control of the resources by external parties such as the emergency services, in the event of a potential emergency situation in any larger ecosystem containing the managed resource.

Embodiments of the disclosure facilitate the operation of federated hierarchical management systems in which numbers of small management domains fall under the umbrella of one or more higher level managers for wider optimization. This is a situation that commonly occurs when utilities are managed; when areas are added to smart cities and when different factory departments are merged into a total production process. The availability of both a local reading and the satisfaction with that reading adds valuable context to the decision making process of the higher level manager.

Using the local satisfaction measure and the details of the policy that caused the observed values the high level manager can make a much more informed decision before making any changes to the federated system The above summary is not intended to describe each illustrated embodiment or every implementation of the subject matter hereof. The figures and the detailed description that follow more particularly exemplify various embodiments.

BRIEF DESCRIPTION OF THE DRAWINGS

By way of example, an embodiment of the disclosure will now be described with reference to the drawings, in which.

Figure 1:
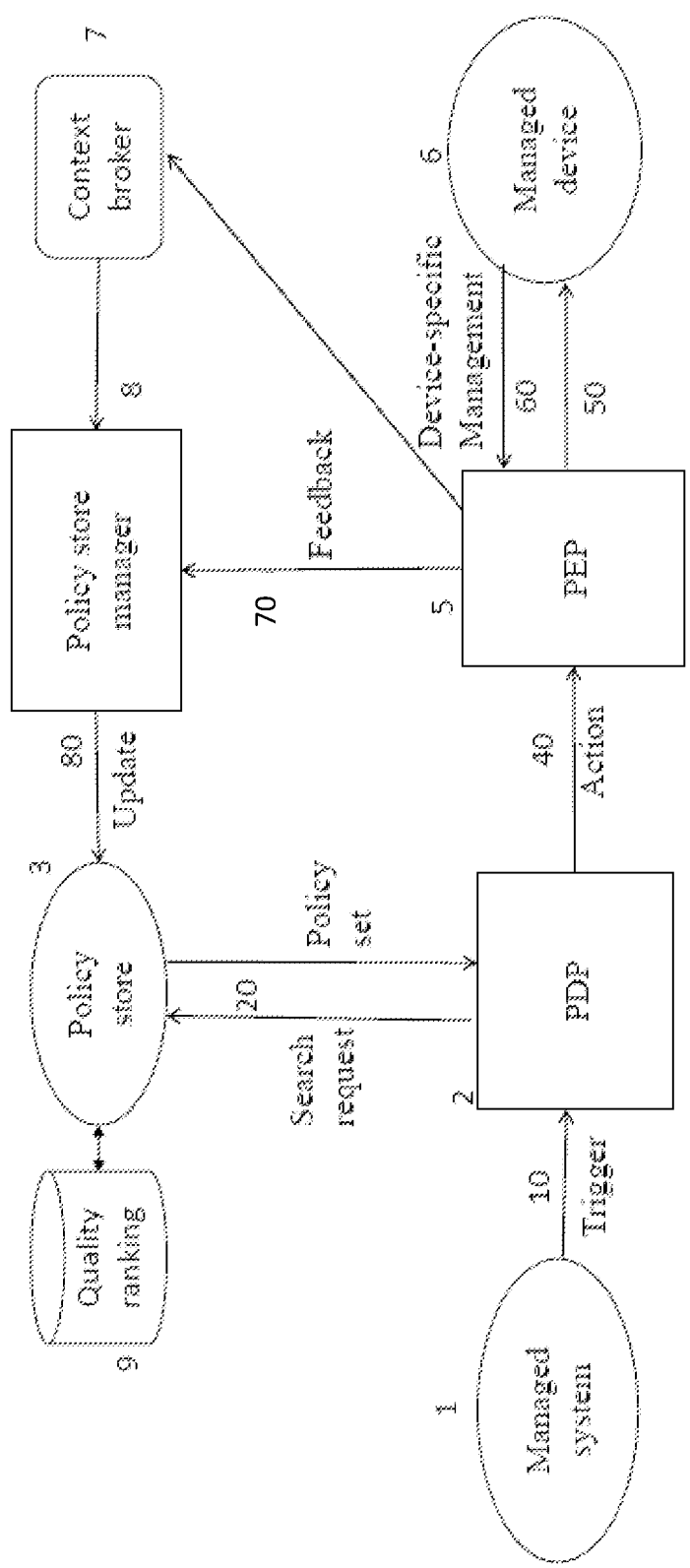
FIG. 1 is a schematic representation of the functional elements of a simplified IoT management system.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 depicts the functional elements which co-operate in each of the managed systems to perform this embodiment of the disclosure and the interactions between them when implementing this process.

Policies are initially stored in a policy store 3. Additional management functions are associated with the policy store 3 to allow the system to receive and update rankings for the policies, which are maintained as an additional field in the data stored for each policy in the store 9. It may use these rankings to prioritize the policies and to provide lists of underperforming policies to the management domain owner or identified person responsible for policy creation and management. This could take the form of an additional policy store management component.

In a conventional architecture, trigger events 10 are received from sensors 1 by a policy decision point (PDP) 2 for that management domain, and the event is used by the PDP to retrieve from the associated policy store 3 a list of any policies associated with that trigger event 10 (at 20). Each of these policies has one or more actions defined in them that target actuators in the managed system. The PDP then checks and evaluates any conditional terms in the policies and prepares a set of actions that need to be enacted, based on the initial policy set and any modifications to that set required by the conditional terms.

The PDP 2 which generates instructions 40 according to the modified policy set, which are to be transmitted to a policy execution point (PEP) 5. The PEP sends control signals 50 to control one or more managed devices (actuators) 6. Once the actuators have carried out their assigned actions, the evaluation process is scheduled.

The feedback may be generated by interrogating other sensors, as well as the actuators 6 which can report their current state (60) to the policy execution point. The PEP uses the feedback data to generate feedback 70 which is reported to the policy store manager 8. The policy store manager uses the feedback to generate updates (80) modifying the policies in the policy store.

Figure 2:
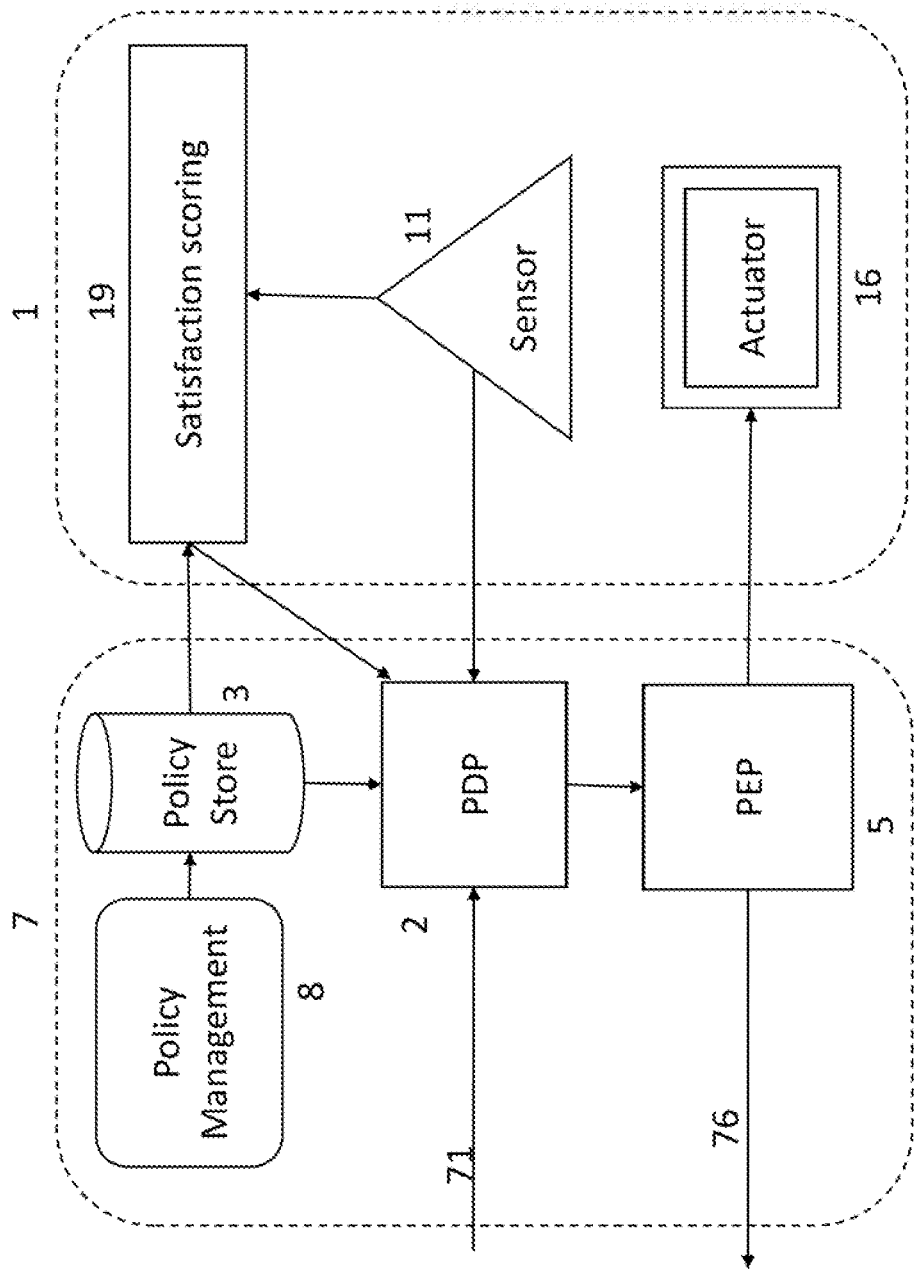
FIG. 2 is a schematic representation of the functional elements of an IoT management system and a controlled installation, which co-operate to perform a first embodiment of the disclosure.

FIG. 2 illustrates a management system arranged to perform a first embodiment of the disclosure. A managed system 1 is controlled by a management system 7. The management system 7 has a policy store 3 which controls the operation of a respective policy decision point 2 and policy execution point 5, in response to inputs from one or more managed systems, generally depicted at 71, to generate outputs to one or more managed systems, generally depicted at 76. The policy store 3 is programmed by a policy management system 8, through which policies can be created and updated as required.

One managed system 1 is depicted in more detail, having a sensor 11 which provides an input to the management system 7. Similarly one or more actuators 16 in the managed system 1 are capable of being controlled by the management system 7.

In this embodiment of the present disclosure, the sensor 11 in the managed system 1 is also associated with a co-operating satisfaction scoring system 19 which is responsive to readings of the sensor 11. The satisfaction scoring system 19 is operated according to a policy specific to the managed device 1, and provides a satisfaction measure as dynamic metadata to the resources managed by the policy and the sensor data stream from the check action providing input to the management system 7. The satisfaction scoring system may be incorporated in the managed system 1 or the management system 7.

Every policy 3 has a unique identity that allows it to be identified, and as part of its specification includes details of its authorship. The dynamic metadata are the date and time of the interaction, the policy identity associated with the actuator change or sensor reading and the satisfaction measure.

This metadata can be stored in a number of ways. Each resource in the system will already have metadata associated with it in a resource catalogue, which includes details such as device type, owner, location, data output specification, and other device specific data. Much of this initial data is immutable. To this data is added a number of dynamic data fields that record the latest policy interaction and satisfaction measure. This satisfaction data could be stored as a single record associated with the resource that is updated every time a policy is executed and a satisfaction measure calculated, or the satisfaction measure and policy data could be associated with the data output of the resource and could then be viewed as a time series alongside the data output.

Monitoring such satisfaction data over time can provide an improved understanding of how the resource is managed and the end users' satisfaction with the outcome, which should lead to a more satisfactory management outcome. For a single sensor/actuator system this would be a simple linear series or two dimensional graph.

An exemplary output is represented in the table below. This could represent, for example, the summer temperature in a greenhouse. As the temperature detected by the sensor 11 gets too hot a policy with ID 634537 is executed. In this example the policy 3 written by the greenhouse owner calls for increased ventilation when the temperature rises to 24 C. The reduced temperature is reported by the sensor 11, together with a satisfaction measure generated by the scoring processor 19 which compares the measured temperature with that set by the local policy 3. A satisfaction measure below a specified threshold is indicative that the policy is not producing the desired outcome, allowing the user to be alerted to amend the policy or determine whether some external factor is responsible—for example in the present example whether the ambient temperature has increased, thereby raising the greenhouse temperature despite the additional ventilation. The policy ID can be used by the management system 7 to query the policy store 3 to ascertain the policy details.

| Time | Temperature | Policy ID | Satisfaction measure |
|---|---|---|---|
| 10:00 | 20 | | |
| 11:00 | 22 | | |
| 12:00 | 24 (trigger point) | | |
| 13:00 (after delay) | 20 | 634537 | 0.87 |
| 14:00 | 21 | | |
| 15:00 | 21 | | |
| 16:00 | 20 | | |

For federated management it is likely that there will be multiple sensors of the same type or with equivalent outputs, and measurements that include a location or geographical dimension as well as a time series of data points. Data of this spatial type is typically displayed on management dashboards as some form of heat map. For the manager looking at such a heat map the added data allows the manager to select a point and to determine if its reading is user driven.

Given an initial graphical display, outputs could be constructed that allow comparisons of the time series of data and policy interactions of similar sensors, at both similar and different locations. This extra data allows the higher level managers to have a more informed view of the global system status and as well as measurements of system behavior gives an indication of end user/local manager requirements. The additional data should aid in creating policies that more accurately reflect the users desires and the higher level optimization required by the manager of the federations.

Figure 3:
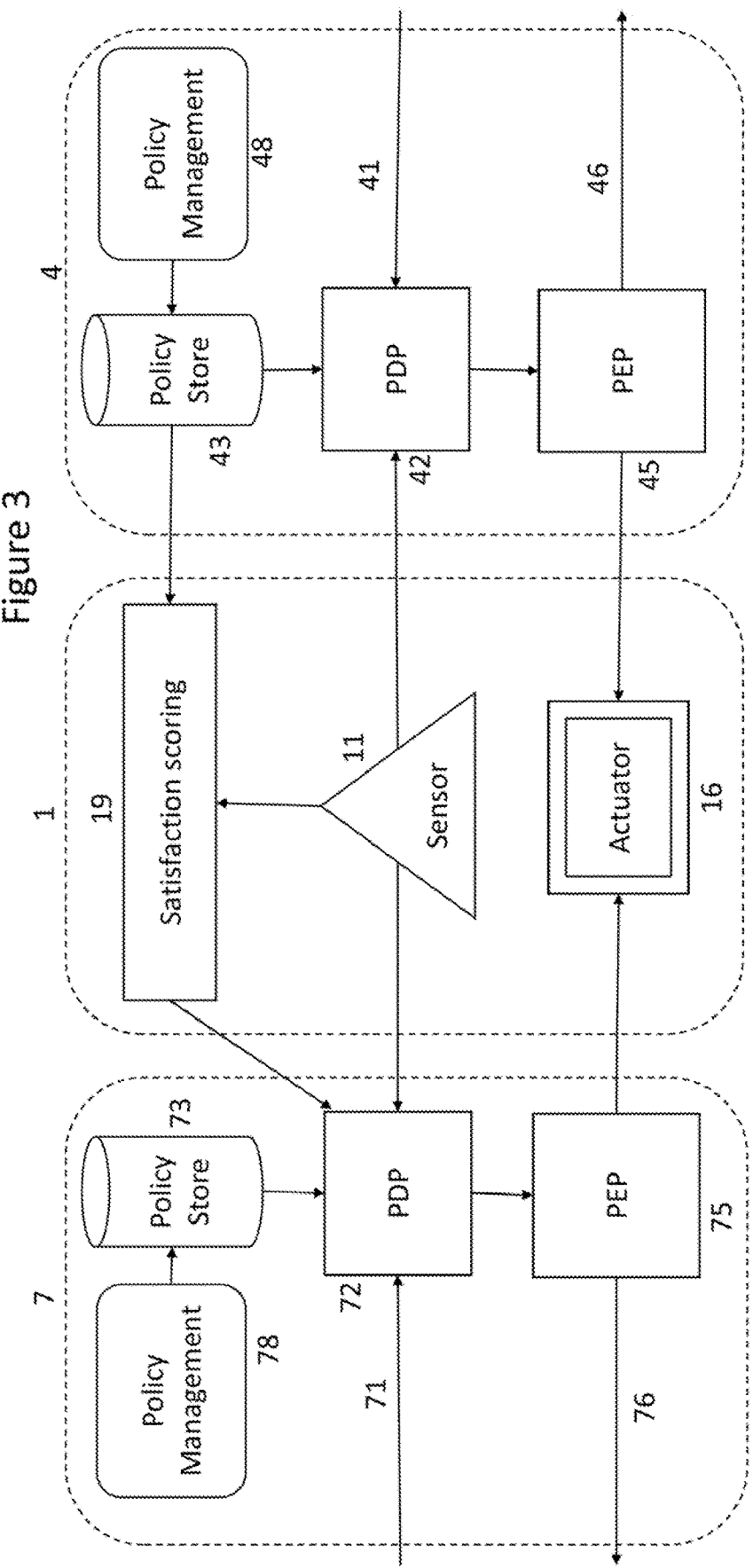
FIG. 3 is a schematic representation of the functional elements of two IoT management systems and a controlled installation, which co-operate to perform a second embodiment of the disclosure.

FIG. 3 illustrates how two such management systems can be coordinated to perform a second embodiment of the disclosure. In this case the managed system 1 is controlled by a local management system 4 as well as a master management system 7. The local management system 4 and master management system 7 each have respective policy stores 43, 73 which control the operation of respective policy decision points 42, 72 and policy execution points 45, 75, in response to inputs, generally depicted at 41, 71 respectively to generate outputs generally depicted at 46, 76 respectively. The policy stores are programmed by respective policy management systems 48, 78, through which policies can be created and updated as required.

One or more sensors 11 in the managed system 1 provide inputs to both the local management system 4 and the master management system 7. Similarly one or more actuators 16 in the managed system 1 are capable of being controlled by both the local management system 4 and the master management system 7.

The sensor 11 in the managed system 1 is associated with a co-operating satisfaction scoring system 19 which is responsive to readings of the sensor 11. The satisfaction scoring system 19 is programmed by the local management system 4 and provides an input to the master management system 7.

It will be understood that the policies of the local management system 4 and the master management system 7 may be in conflict: for example the policy of the sensor 11 may result in the master policy 73 requiring the actuator 16 to perform a first function whilst local policy 43 may require the actuator to perform a second function. Such conflicting inputs could have a number of outcomes, none of them ideal. The different inputs to the actuator may combine in unpredictable ways, for example to settle in an intermediate state which is contrary to both policies, or to flip-flop between the two states in response to changes detected by the sensor. In this simplified diagram there is only one sensor 11 and one actuator 16, but the two policies may each be triggered by different sensors, and/or operate different actuators. For example a refrigeration unit in a chiller cabinet in a shop may respond to rising temperatures in the unit by increasing the rate of circulation of refrigerant in the chiller cabinet. This may have the additional effect of reducing the ambient temperature in the area of the shop near the chiller cabinet. A temperature sensor elsewhere in the shop may detect this reduction in temperature, and initiate an increase in the rate of heating in the shop's central heating system. This in turn will increase the temperature in and around the chiller cabinet, causing a further increase in the refrigeration rate. This escalation would continue indefinitely, or at least until one of the two competing systems reaches its maximum power output.

Figure 4:
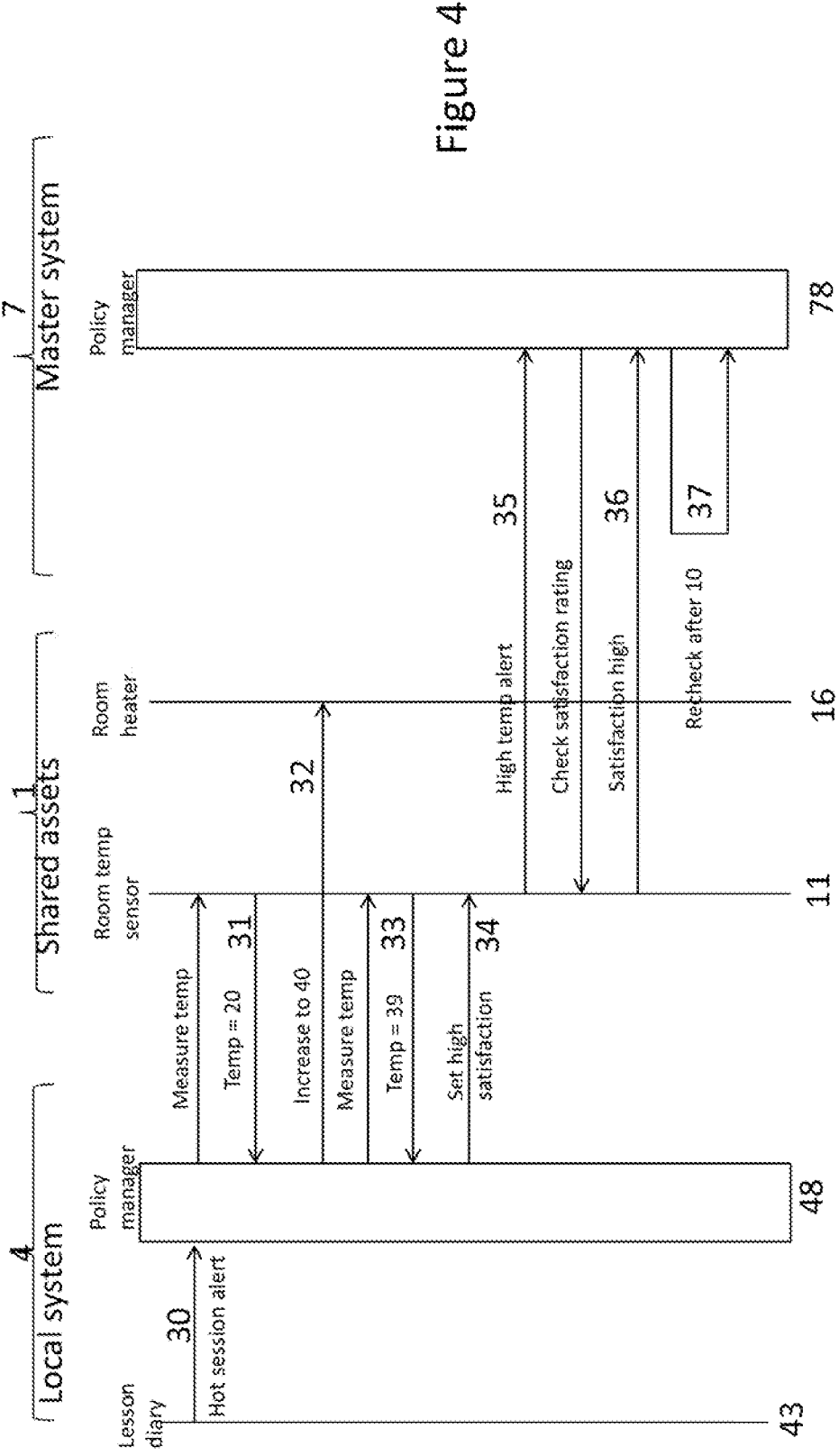
FIG. 4 is a schematic flow chart illustrating a process operating according to the second embodiment of the disclosure.

Embodiments of the disclosure can be used to avoid such conflicts, as will now be described with reference to FIGS. 3 and 4, which illustrate a simplified example of a process according to the disclosure. In this embodiment, there are two overlapping management systems. As shown in FIG. 3, a large multi-use commercial complex space such as a shopping centre or leisure facility has an overarching management system 7 for the complete complex, allowing a local facilities manager to optimize energy usage and provide appropriate heating and cooling to maintain the comfort of the users of the complex. However, individual units also have independent heating and ventilation controls 16, 46 and multiple temperature measurement sensors 11, 41.

Both operators have a common overall goal of being profitable and staying in business but their sub goals and the management options they use to achieve these goals will be different. Any "smart system" needs to address the requirements of all stakeholders.

The operators of the individual units will have a range of data available and access to some monitoring and control of the infrastructure. This may include scheduling conditions (for instance opening hours, special sessions, etc.).

There will also be shared data such as sensor outputs detecting local air quality, temperature, humidity, heater system settings, occupant sensing and building security functions, safety sensors (e.g., smoke detectors), local power consumption for billing and usage optimization, and equipment status monitors—to manage maintenance, repair and contingency arrangements.

Control options available to the local operator may include the ability to control air quality, actuate heating, cooling, and dehumidifying. This may include standalone units not visible to the higher levels.

In this example the local system 4 is a relatively simple "smart system" that controls the environment for the customers of the individual unit, using a mix of private and shared data to drive local conditions. Other policies might also include time triggered policies to reduce energy consumption out of hours (e.g., when the unit is closed but the complex is open) and thereby manage utility spend.

Each of these local policies will generate a local satisfaction measure for their outcomes.

The manager of the complex will have similar options. This will include private data as well as the shared data referred to above. The manager of the complex will also have overall control of all the global systems that form a part of the operating fabric of the complex.

It is assumed for present purposes that the major facilities will operate in zones, encompassing several individual units, to benefit from the economies of scale so air handling units might service multiple user zones.

In this example the operator of this unit offers a service which requires temperatures in that unit to be above the norm set for the complex centre as a whole, and has set a policy 43 to heat the unit ten minutes prior to the session if attendees are booked for that session. The policy could be of the form:

if calendar indicates hot session (policy trigger) & studio temp<40 C (policy condition)
then increase heat input to studio (policy action)
and after 10 minutes take studio temperature, and compare with initial condition to generate satisfaction measure (policy check).

This policy is implemented by the policy decision point 42 and executed by the policy execution point 45. As well as the policy itself (43), which triggers the initial operation of the PDP 42 according to the time and date, the PDP is controlled by the temperature detected by the sensor 11.

A corresponding policy would state, for example, that if room temp is 40 c and no "hot session" is underway the temperature is reduced to 20 C. There could also be similar local policies that actuate dehumidifiers to reduce humidity after a "hot session" or when the number of participants is high.

The policy system of the manager of the complex will be considerably more complex particularly when it comes to optimizing usage of multiple actuators to achieve a goal. However, to take a simple example, it may have a target indoor temperature of 20 C, and a policy that states that if temperature is greater than 20 C and the time is during opening hours a cooling system is activated, and of course a companion policy to turn on a heating system if the temp falls below 20 C during opening hours. These are of course global policies for the whole complex, but we can assume a distribution of sensors and some distributed heating and cooling devices so that finer grain policies can be imagined, for instance having separate policies for each floor of the complex. These finer grain policies could also of course include checking of adjacent sensors to determine if the temperature variance was local or more wide spread, such a policy could be of the form if temp on $1^{st}$ floor zone 1 is greater than 20 C and temp in zone 2 is also greater than 20 C increase $1^{st}$ floor cooling.

We can now consider how the local and central management schemes interact and the significance of the satisfaction measure.

To some extent the local unit management policies can be considered a "black box" from the viewpoint of the central manager. The central manager can measure the shared sensor outputs, and change the external inputs under its control, but it has no view of the local manager's policies other than the satisfaction measures arising from implementation of those policies. This has the additional benefit of giving the individual unit manager some privacy protection Referring to FIG. 4, the local system 4 triggers a policy in response to an alert 30 triggered by a timer 43. The policy requires the temperature to rise to 40 C for a session starting in ten minutes. The local policy manager 48 checks the local temperature sensor 11 (at 31) and, if the temperature is below the required level it activates the heater 16 (at 32). After ten minutes have elapsed it checks the temperature sensor 11 again (at 33). In this example the reading is 39 C. This is close to the target temperature so the local policy manager 48 reports a high satisfaction measure (at 34) and this is reported to the sensor 11 and in turn to the master system 7. As the reading is still below the target temperature of the local policy, the heater therefore remains in operation.

In the absence of the satisfaction measure, the master system would detect the temperature as above the target figure set for its own policy, and would attempt to take action to reduce the temperature in the region of the sensor, either by sending instructions to the heater which conflict with those of the local policy, or by operating other actuators such as increasing ventilation, or even evacuating the building. Instead, the satisfaction measure indicates that the sensor is responding appropriately to a local policy which is permitted to over-ride the master policy. The data stream associated with the relevant sensor 11 is annotated with additional data that states the temperature at the time of initiation of the policy, and at a predetermined time after its implementation, from which can be generated a satisfaction measure. The heating controller setting would similarly be annotated to indicate that its value was changed as a result of the policy, and the value of the resulting satisfaction measure. This is a purely local management policy that meets the local goals of the studio operator to heat the studio for specialist sessions. The index would normally take a value between zero and one, the greater the value of the satisfaction measure the closer the action came to meeting the aims of the policy. (A negative satisfaction measure would indicate the sensor is now detecting a less desired outcome than when the policy was initiated, suggesting either that the policy needs revision, or that some external influence has affected the sensor reading (for example the ambient temperature may be falling faster than the heating system can compensate).)

The high-level system, will detect the temperature in the local unit from temperature sensor outputs (which might for example be displayed graphically as a heat map on a management console).

In this example the master management system 78 the PDP 72 is set to be triggered by any temperature sensor recording a temperature above 25 C. If the system includes a policy that identifies the high temperature as an anomaly it would normally make changes to the overall heating and ventilation systems to mitigate the high temperature. Consequently, it will be triggered by its next reading of the local temperature sensor 11 (at 35). If it acted on this trigger, by attempting to reduce the temperature, this might cause a higher energy consumption overall and produce an even greater temperature imbalance as the high level manager seeks to produce a uniform temperature while the studio manager constantly turns up the heating to reach 40 C.

In order to avoid this situation, before taking any action the master management system 78 may first check temperature sensors in neighboring zones to determine if the condition is localized. It then checks the satisfaction measure associated with the local sensor 11 (at 36). If the index is reported as high then the policy manager allows the otherwise anomalous temperate to continue and takes no action. A low satisfaction figure indicates that the anomalous condition is not the result of a localized policy requirement, and the master system will implement its own general policy in respect of the actuator in question.

In this embodiment, when the high level manager first observes the high local temperature (or other property that is non-optimal for its general policy) it queries the dynamic metadata associated with the temperature sensor or heater and determines from the metadata that it had been used by a defined local policy to create the high temperature and that the local user had determined this to be a satisfactory state. According to its own policy settings it can then take the appropriate action, which in this case is to do nothing despite the high temperature reading.

The high level manager policy may nonetheless allow it to take overriding decisions where appropriate, for example if the high temperature is causing a conflict with another policy associated with another unit (in which case some compromise action may be prescribed). However, the additional local satisfaction measures provide additional context on which the overall management system can base any decision.

The policy may require a check after a period (at 37) before implementation of the central policy, to allow the local system to stabilize.

Additional policies may be created. For example the master policy manager 78 may check for occupancy, and use the time field in the dynamic data to identify the execution time for the policy. The high level manager 48 can then override the local heating policy if the satisfaction measure was generated earlier in the day and the current time is when the complex is closed, so extra heat may be unnecessary.

The availability of the local satisfaction measure therefore supplies context to the higher level manager 78, which may be used to make more effective decisions and avoid rule competition. The satisfaction measure can be configured as an input that determines whether the central policy manager 78 or the local policy manager 48 should, for the time being, control the actuators 16 which they both have the ability to control. The central policy manager 78 will require policies in its policy store 73 to control the environment in the rest of the complex when it has relinquished control of one or more individual actuators 16. This may include taking countermeasures in neighboring actuators, to compensate for any extra heat carried by conduction or convection into the neighboring units, by reducing the heat output in neighboring actuators.

Other facilities may have other environmental requirements, for instance a shop unit selling perishable goods may have refrigerated ("chiller") display units which cause the area around them to be cooler than the temperature set for the shopping centre as a whole. The shop may therefore set a policy which allows the temperature around the chiller units to fall below that set for the shopping centre as a whole, the temperature of the food in the cabinets taking precedence.

Figure 5:
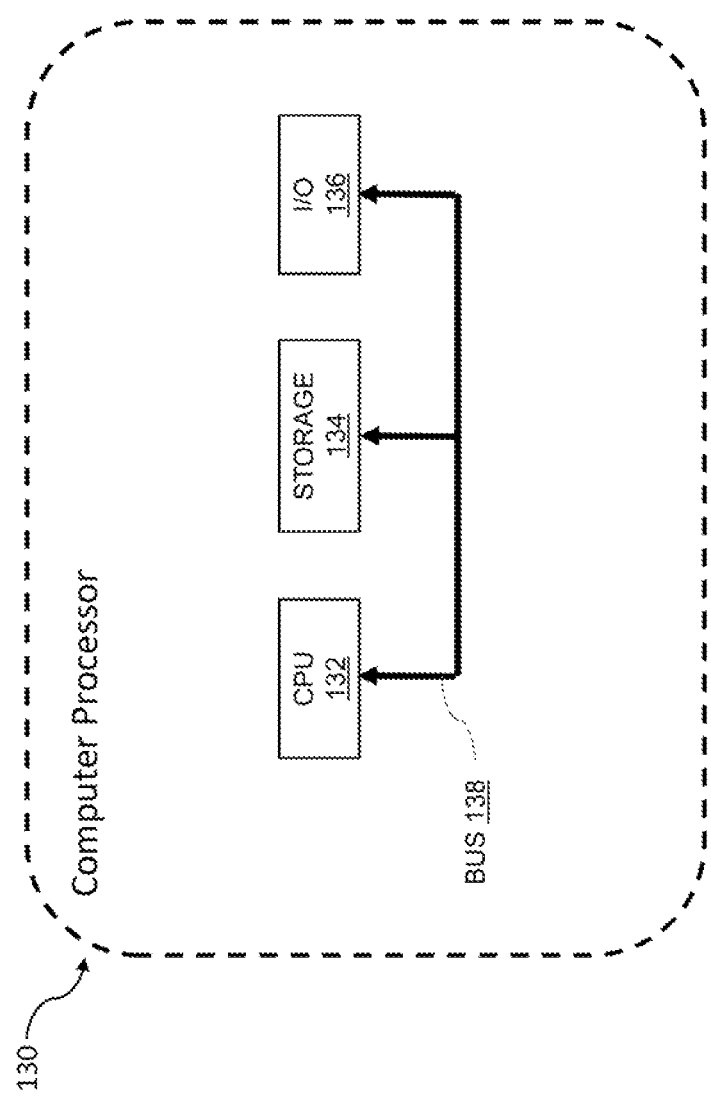
FIG. 5 is a block diagram of a computer system suitable for the operation of embodiments of the present disclosure.

FIG. 5 is a block diagram of a computer processor 130 suitable for the operation of embodiments of the present disclosure, or processing modules thereof. A central processor unit (CPU) 132 is communicatively connected to a data store 134 and an input/output (I/O) interface 136 via a data bus 138. The data store 134 can be any read/write storage device or combination of devices such as a random access memory (RAM) or a non-volatile storage device, and can be used for storing executable and/or non-executable data. Examples of non-volatile storage devices include disk or tape storage devices. The I/O interface 136 is an interface to devices for the input or output of data, or for both input and output of data. Examples of I/O devices connectable to I/O interface 136 include a keyboard, a mouse, a display (such as a monitor) and a network connection.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of monitoring and controlling an automated system using a network of sensors and actuators operating in accordance with predetermined policies, wherein effectiveness of individual policies is monitored by comparing inputs from the sensors with intended outcomes from implementations of policies controlled by previous inputs from one or more of the same sensors, the method comprising:
measuring effectiveness of a first policy implemented by a first decision point by identifying an intended outcome from the first policy, measuring an input from a sensor following implementation of the first policy, and comparing the input from the sensor with an intended outcome of the first policy to derive a satisfaction measure; and
using the satisfaction measure as a metadata element in data transmitted to one or more further decision points to control implementation of further policies associated with the further decision points.

2. The method according to claim 1, wherein the further policies suspend actuation commands to an actuator controlled by both the first policy and the further policies if the metadata element indicates the first policy has been satisfied.

3. The method according to claim 1, wherein one or more of the further policies have provision to over-ride the first policy in response to inputs from further sensors.

4. The method according to claim 1, wherein the first policy includes a check function, the check function using a sensor input to monitor if actions generated by the first policy are successful in moving the system towards a system state specified by the first policy, and generating a positive satisfaction measure if the check function is satisfied.

5. The method according to claim 4, wherein the check function is initiated after a predetermined period has elapsed after the actions initiated by the first policy.

6. The method according to claim 1, wherein the metadata element carrying the satisfaction measure also includes data identifying a policy creator.

7. The method according to claim 1, in which the metadata element carrying the satisfaction measure also includes data identifying resources which were changed or measured when the first policy was enacted.

8. A computer system comprising:
at least one processor and memory storing computer program code for monitoring and controlling an automated system using a network of sensors and actuators operating in accordance with predetermined policies, wherein effectiveness of individual policies is monitored by comparing inputs from the sensors with intended outcomes from implementations of policies controlled by previous inputs from one or more of the same sensors, by:
measuring effectiveness of a first policy implemented by a first decision point by identifying an intended outcome from the first policy, measuring an input from a sensor following implementation of the first policy, and comparing the input from the sensor with an intended outcome of the first policy to derive a satisfaction measure; and
using the satisfaction measure as a metadata element in data transmitted to one or more further decision points to control implementation of further policies associated with the further decision points.

9. A non-transitory computer-readable storage medium storing a computer program element comprising computer program code to, when loaded into a computer system and executed thereon, cause the computer system to perform the method as claimed in claim 1.

10. A network for monitoring and controlling an environment in accordance with predetermined policies, the network comprising:
a plurality of sensors and actuators;
a plurality of policy decision points for responding to trigger inputs received from the sensors;
one or more data stores for maintaining policies for retrieval by the policy decision points;
a plurality of policy execution points for controlling the actuators in response to commands received from the policy decision points; and
a policy satisfaction monitoring element which identifies effectiveness of a first policy implemented by a first policy decision point by identifying an intended outcome from the first policy, measuring an input from one of the sensors following implementation of the first policy, comparing the input from the sensor with an intended outcome of the first policy to derive a satisfaction measure, and transmitting the satisfaction measure as a metadata element in data transmitted to one or more further decision points associated with further policies.

11. The network according to claim 10, wherein one or more of the actuators are controllable by both the first decision point and one or more of the further decision points, and the further decision points are configured to suspend actuation commands to such actuators if the metadata element indicates a first policy initiated by the first decision point is satisfied.

12. The network according to claim 10, wherein one or more of the further decision points have provision to over-ride the first policy in response to inputs from further sensors.

13. The network according to claim 10, wherein the first policy includes a check function, using a sensor input to monitor if actions generated by the first policy are successful in moving the system towards a system state specified by the first policy, and generating a positive satisfaction measure if the check function is satisfied.

14. The network according to claim 13, wherein the check function is initiated after a predetermined period after the actions initiated by the first policy.

15. The network according to claim 10, wherein the metadata element carrying the satisfaction measure also includes data identifying resources which were changed or measured when the first policy was enacted.

* * * * *